United States Patent [19]

Mueller

[11] Patent Number: 4,579,192
[45] Date of Patent: Apr. 1, 1986

[54] METHOD AND APPARATUS FOR SEALING A CLOSURE GAP

[76] Inventor: Peter Mueller, Widmerstrasse 27, Zuerich, Switzerland

[21] Appl. No.: 593,392

[22] Filed: Mar. 26, 1984

[30] Foreign Application Priority Data

Mar. 25, 1983 [CH] Switzerland .................. 1667/83

[51] Int. Cl.$^4$ ............................................. B60K 28/12
[52] U.S. Cl. ........................................ 180/281; 277/34
[58] Field of Search ............... 277/34.3, 34.6, 34; 180/281, 286

[56] References Cited

U.S. PATENT DOCUMENTS 4,401,306  8/1983  Arnold ..................... 277/34.3

FOREIGN PATENT DOCUMENTS 442305  2/1936  United Kingdom .......... 180/82.2

Primary Examiner—Henry Bennett
Attorney, Agent, or Firm—Walter C. Farley

[57] ABSTRACT

A door on a vehicle is provided with a packing assembly including at least one inflatable member which can be pressurized by a medium such as compressed air from a pressure source so that a completely satisfactory seal is attained. The system includes a control apparatus which responds to a speed sensor to act on a pressure sensor which controls a multi-way valve to supply pressure medium above a determined speed but below a determined pressure. When the pressurization exceeds a predetermined pressure level, the supply of medium under pressure is terminated and the pressurized member is maintained pressurized by a check valve. When used in vehicles, the structure provides a good seal around an openable closure but permits easy opening after depressurization.

9 Claims, 5 Drawing Figures 4,579,192

METHOD AND APPARATUS FOR SEALING A CLOSURE GAP

This invention relates to a method for forming a seal to close a gap between parts of a movable body such as a vehicle, particularly a gap such as that which exists around one or more closures in the body, and to an apparatus for forming such a seal.

BACKGROUND OF THE INVENTION

In moving bodies, such as land vehicles, and particularly automobiles, but also railroad cars as well as watercraft and aircraft, there are openings such as doors and windows which have openable closures. It is important for the comfort of the passengers that the movable parts, i.e., the doors and windows, are closed as tightly as possible when travelling.

However, it must be possible to open and close them with as little force as possible. Forming a good seal between the relatively movable parts such as the frame which is fixed to the vehicle body and a door or window which is movable relative thereto, while still permitting easy opening and closing of the movable components, are problems the solution of which requires the use of means which have an influence on one another. Thus, a good seal between the two parts can be achieved by placing a flexible, soft packing element between the two parts along the gap therebetween so that the packing element is jammed or compressed when the opening is closed. The greater the jamming or clamping force, the better the seal. However, increased clamping force makes it necessary to use a correspondingly larger amount of force to perform the opening and closing.

However, if the parts are to be constructed so that they can be easily opened and closed, the clamping force acting on the soft packing element must be made correspondingly low. Thus, it appears that measures which are mutually exclusive with regard to one another must be used for obtaining a good seal on the one hand and easy opening and closing on the other.

In practice, a compromise is generally made by constructing a soft packing member in such a way that, on the one hand, it ensures a good seal but nevertheless permits easy opening and closing. Such members are thus designed as soft packing members with a relatively large profile, the packing member being either hollow or filled with a foam material.

Despite the fact that this compromise is consistently used for the doors and windows of motor vehicles, the solution is no more than a compromise. The disadvantage of such a structure is apparent at high travelling speeds because the clamping force of the soft packing material is not sufficient to ensure an adequate seal.

BRIEF SUMMARY OF THE INVENTION

Accordingly, an object of the present invention is to provide a method of sealing a gap between relatively movable portions of a movable body which is formed in such a way that a completely satisfactory seal and securing of the relatively movable parts is ensured as well as easy opening and closing thereof.

A further object is to provide such a structure which exhibits good sound insulation at high speeds.

Briefly described, the method of the present invention for sealing a gap between two parts of a movable body such as a vehicle wherein one of the parts is movable relative to the others between open and closed positions includes providing at least one packing member extending along the gap on at least one of the parts, the packing member being pressurizable to change shape and fill the gap between the parts in the closed position. The method further includes supplying a fluid medium under pressure to the packing member when the movable body is in motion to completely seal the gap.

In another aspect, the invention includes an apparatus for forming a seal in a gap between two relatively movable parts of a movable body such as a vehicle, wherein one of the parts is movable relative to the other between open and closed positions including a first packing member mounted on the edge of one of the movable parts in a position to face an edge of the other movable part in the closed position. A second packing member is mounted on the edge of the other movable part in a position to face the first packing member in the closed position, the second packing member including a pressurizable chamber and being elastically deformable toward the first packing member when the chamber is supplied with a fluid medium under pressure. A source of fluid under pressure is provided and a conduit and control means is also provided for controlling the supply of fluid under pressure to the chamber. The control means includes means responsive to the speed of the movable body and to the pressure in the chamber for pressurizing the chamber to a selected level when the body is moving faster than a predetermined speed.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF PREFERRED EMBODIMENTS

The basic concept of the invention is that the objective of good sealing on the one hand and easy opening and closing of two movable parts on the other hand can be solved in an optimum manner if the packing member is influenced in such a way that a high clamping force is exerted for sealing and a low clamping force exists during opening and closing. This is accomplished by a system as shown in FIG. 1 with control means, two embodiments of which are shown in FIGS. 2 and 3.

Figure 1:
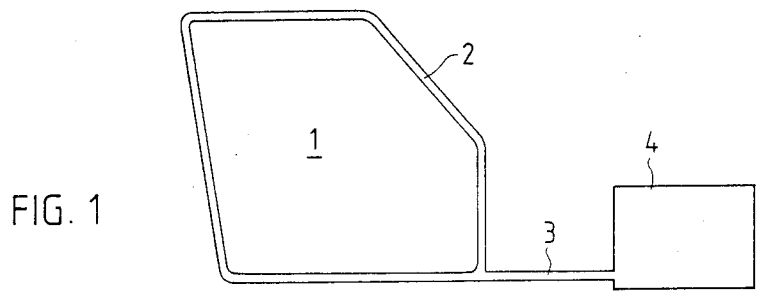
FIG. 1 is a simplified schematic diagram of an installation for sealing the door in a motor vehicle.

FIG. 1 shows a very simplified diagram of an installation for sealing the gap between a car door and the surrounding frame and body structure which is not specifically illustrated in FIG. 1. In this system a packing member is provided on both the door frame and around the frame of the body, the assembly being indicated generally at 2 and illustrated in more detail in FIGS. 2, 3, 4 and 5. An inflatable or pressurizable portion of the packing member 2 is connected by a fluid line to a pressurizing and control device 4 which essentially includes a pressure source and a control means for controlling the supply of a fluid under pressure such as compressed air to the packing assembly 2. When the door is closed and the packing member 2 is pressurized, a very effective seal is formed in the gap between the door and body and the packing assembly also forms a securing structure with a high clamping force. However, for the easy opening and closing of the door, the packing member is simply depressurized.

Figure 2:
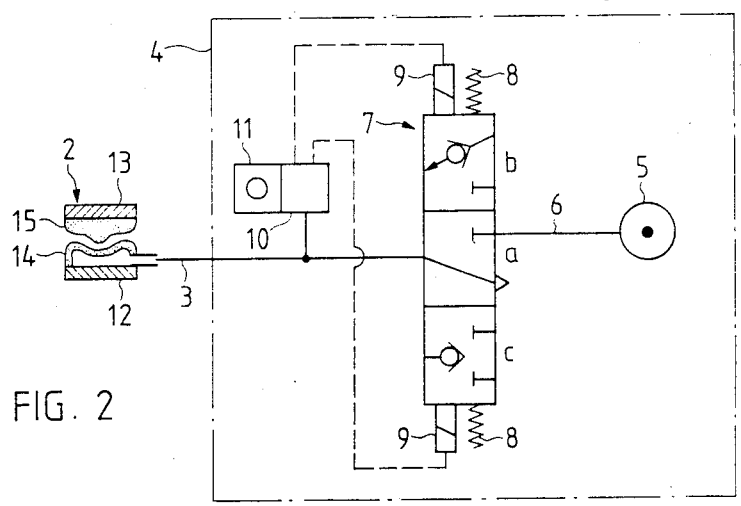
FIG. 2 is a schematic fluid circuit diagram of a pressure system for operating the apparatus of FIG. 1.
Figure 3:
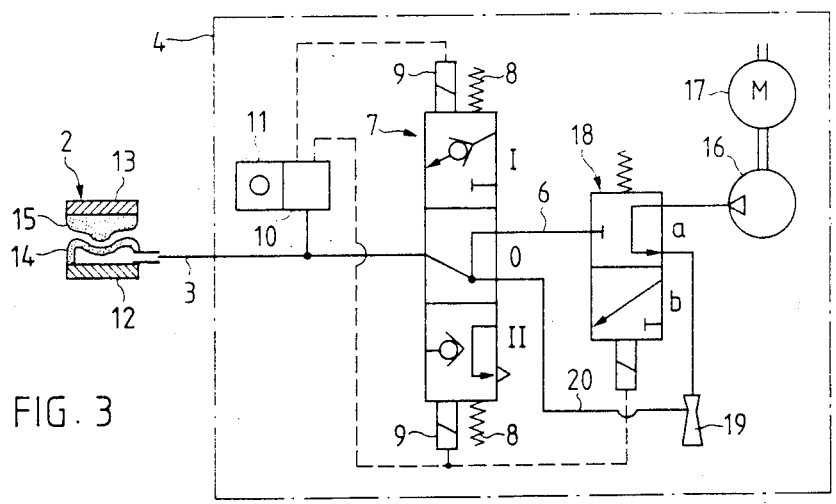
FIG. 3 is a schematic fluid circuit diagram of a further embodiment of a pressurizing system for operating the apparatus of FIG. 1.

In the fluid circuit diagram shown in FIG. 2, the pressurizing and control device 4 is shown by a broken line and includes a pressure source 5. For purposes of FIG. 2, it will be assumed that the vehicle to which the invention is applied already has a source of compressed air as is found on some motor and rail vehicles. The compressor is present for the purpose of supplying a pressure network to operate other equipment requiring such a pressure medium and this pressure medium can be tapped for purposes of pressurizing packing member 2. A line 6 extends from pressure source 5 to a control valve 7 which is a 3-port, 3-position valve which is normally centered by the action of springs 8 and which can be moved to either of the end positions by the action of electromagnets 9. Control valve 7 is connected by a line 3 to packing assembly 2. A pressure sensor 10 is connected to sense the pressure in line 3 and a speed sensor 11 is operatively associated with pressure sensor 10.

Packing assembly 2, as shown in the schematic sectional view of FIG. 2, is applied to a vehicle of which the body frame portion is shown at 12 and the door portion is shown at 13. Thus, with respect to the movable vehicle itself, member 12 is fixed and member 13 is relatively movable. The packing itself includes two soft, profiled packing members 14 and 15 which are elongated members extending around the door and along the inner surface of the frame so that, when the door is in its closed position the members face each other. Packing member 14 which is attached to the body frame 12 is formed as a hollow tubular member which can be pressurized by the pressure medium from device 4. Both of members 14 and 15 are so constructed that when member 14 is pressurized with the medium they are pressed against each other with a high force. If the pressure medium is removed from member 14, the two members 14, 15 rest against one another in a relaxed state, the compressive force being correspondingly low. The members are shown separated in FIGS. 2 and 3 simply for ease of illustration.

Pressure sensor 10 and speed sensor 11 cooperate in such a way that below a preselected limit speed of, for example, 15 km/h, the speed sensor 11 switches off the pressure sensor 12. In that condition, neither electromagnet is energized and valve 7 is in the position shown in FIG. 2. After the vehicle accelerates to the selected speed, speed sensor 11 enables the pressure sensor which activates the upper solenoid 9, moving valve 7 so that portion b of the valve connects the pressure line 6 to line 3, inflating member 14 and causing it to press firmly against member 15. Pressure sensor 10 is set to respond to a predetermined pressure in line 3 and, when that pressure is reached, the energization of the solenoids is reversed and portion c of the valve is moved to the operative position between the compressor and the seal assembly, terminating the supply of fluid under pressure to the inflatable seal but keeping the seal inflated by moving a check valve into the operative position at the end of line 3. Thus, the shape of member 14 and its pressing action against member 15 is maintained. If the pressure in member 14 drops, this is detected by pressure sensor 10 and the valve 7 is again switched to position b in which the compressor operates to re-inflate member 14. However, regardless of the pressure, as soon as the speed of the vehicle drops below the preselected value, the activity of the pressure sensor is switched off and springs 8 are allowed to restore control valve 7 to the middle or neutral position a in which member 14 is vented to the atmosphere.

If the vehicle does not have a pressure network, a compressor must be provided to pressurize member 14 as shown in FIG. 3. In that embodiment, a motor 17 which is energized by the electrical system or hydraulic system of the vehicle is used as the driver to drive compressor 16. Control valve 7 is again a 3-port, 3-position valve but the control paths differ somewhat because line 6 of compressor 16 must have an outlet to the atmosphere in both the middle or neutral position 0 and in the operating position II.

FIG. 3 additionally shows that member 14 not only has a vent path to the atmosphere but also is connected to a line 6 in the middle or neutral position.

In FIG. 3 a 2-position, 3-port valve 18 with operating positions a and b is provided to supply suction for removing pressure medium from member 14. In operating position a, the compressor is connected to line 6 and to control valve 7 while in position b the compressor 16 acts on the driving sleeve of a jet apparatus 19 which operates, with a Bernoulli configuration, to aspirate air from a return line 20. Again, this process is only allowed to take place if the travelling speed of the vehicle is below the preselected limit speed.

In both of the embodiments of FIGS. 2 and 3, the speed sensor 11 can be a counter which is connected to the same point of the vehicle drive at which a tachometer is connected. However, speed sensor 11 can also take some other form such as, for example, an air speed sensor.

The soft packing member 14 need not be constructed as a hollow member as shown. It is also possible to use a structure somewhat similar to member 15 but which is provided with an interior hose or tube which acts as an inflatable pressurizable member pushing against the foam material from the inside. In either case, a pressurizable chamber is provided and the important aspect is that the two problems of effective sealing and easy opening and closing are solved by pressurization of one of the soft profiles 14, 15. As mentioned, the pressurization also ensures that the two relatively movable parts are reliably secured together so that the opening of a door is not possible under pressurized conditions.

Figure 4:
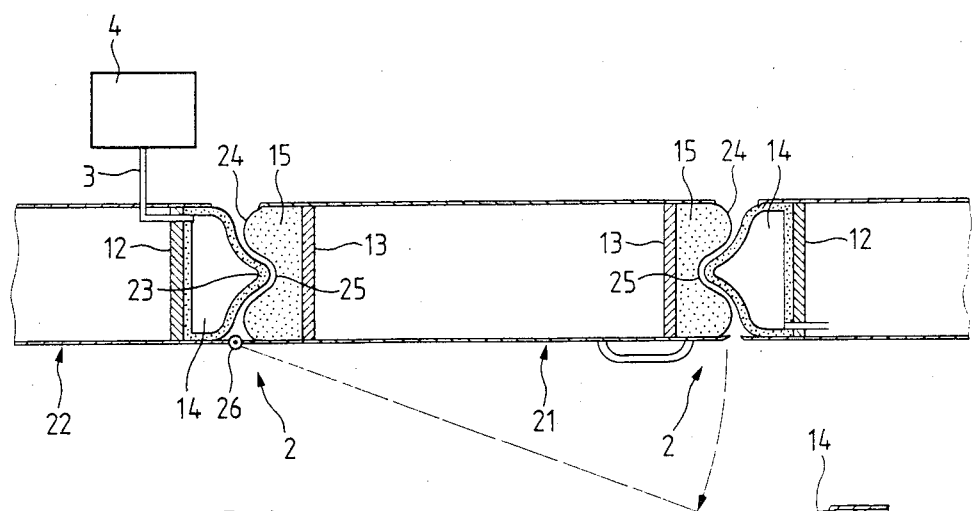
FIG. 4 is a transverse sectional view of an installation according to FIG. 1 showing a seal arrangement in accordance with the invention in greater detail.

FIG. 4 shows the seal structure of a door 21 of a motor vehicle using a packing assembly 2 with portions 14 thereof being constructed as a pressurizable, inflatable member which is fixed to the frame 12 of a body wall 22, member 14 surrounding a portion 15 which is attached to door frame 13. As illustrated, it is desirable to form one of the members with at least one elongated protruding portion and to form the other portion with an elongated mating recess so that under pressurized conditions, projection 23 meshes with recess 25 between a pair of protruding projections 24.

Thus, if the closed door 21, which is swingable about a hinge axis 26, is closed and pressurized, projection 23 is positively engaged in recess 25 and opening of the door 21 is prevented. Thus, the packing member fulfills the two functions of sealing and securing the door.

Figure 5:
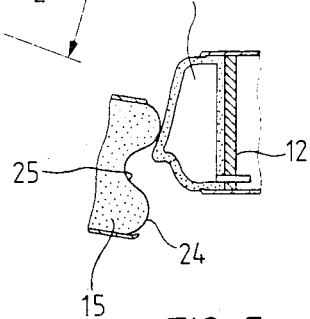
FIG. 5 is a partial sectional view of the seal arrangement of FIG. 4 in a different position of the components.

Because member 14 is flexible, door 21 can be opened without difficulty after depressurization because projection 23 is forced elastically to the side by one of the projections 24 as illustrated in the partial view of FIG. 5. However, portion 14 can also be formed with a shape in which the projection is retracted, the material thereof returning to the retracted position, the shape of which resembles member 15, when pressure is relieved. Thus, after depressurization, the protruding portion retracts to such an extent that portion 15 no longer comes in contact with portion 14 when the door is opened.

While certain advantageous embodiments have been chosen to illustrate the invention it will be understood by those skilled in the art that various changes and modifications can be made therein without departing from the scope of the invention as defined in the appended claims.

What is claimed is:

1. A method of sealing a gap between two parts of a movable body such as a vehicle wherein one of the parts is movable relative to the other between open and closed positions, including
   providing at least one packing member extending along the gap on at least one of the parts, the packing member being pressurizable to change shape and fill the gap between the parts in the closed position,
   supplying a fluid medium under pressure to the packing member until a selected pressure is reached when the movable body is in motion and only when the motion of the body exceeds a predetermined speed to completely seal the gap,
   closing paths the packing member to maintain the pressure level, and
   interrupting the supply of pressure medium to the packing member.

2. A method of sealing a gap between two parts of a movable body such as a vehicle wherein one of the parts is movable relative to the other beween open and closed positions, including
   providing at least one packing member extending along the gap on at least one of the parts, the packing member being pressurizable to change shape and fill the gap between the parts in the closed position, and
   supplying a fluid medium under pressure to the packing member until a selected pressure is reached, when the movable body is in motion to completely seal the gap,
   closing paths to the packing member to maintain the pressure level, and
   interrupting the supply of pressure medium to the packing member.

3. An apparatus for forming a seal in a gap between two relatively movable parts of a movable body such as a vehicle wherein one of the parts is movable relative to the other between open and closed positions, the apparatus comprising the combination of
   a first packing member mounted on the edge of one of the movable parts in a position to face an edge of the other movable part in the closed position;
   a second packing member mounted on the edge of said other movable part in a position to face said first packing member in said closed position,
   said second packing member including a pressurizable chamber and being elastically deformable toward said first packing member when said chamber is supplied with a fluid medium under pressure;
   a source of fluid under pressure; and
   conduit and control means for controlling the supply of fluid under pressure to said chamber including means responsive to the speed of said movable body and the pressure in said chamber for pressurizing said chamber to a selected level when the body is moving faster than a predetermined speed.

4. A method according to claim 1 which includes applying suction to the packing member to depressurize the member when the speed of the body drops below a predetermined value.

5. An apparatus according to claim 3 wherein said source of fluid under pressure is a compressor carried by said body and activated in response to signals from said control means.

6. An apparatus according to claim 5 and including a controlled outlet connected to said chamber for controlling depressurization thereof.

7. An apparatus according to claim 6 wherein said controlled outlet includes means for creating suction to withdraw pressurized fluid from said chamber.

8. An apparatus according to claim 3 wherein said first and second packing members engage each other in a meshing fashion under pressurized conditions to both physically fix the relatively movable parts in the closed position and to seal the gap therebetween.

9. An apparatus according to claim 8 wherein one of said parts is a swingable closure and the other of said parts is fixedly attached to said body,
   wherein said first packing member is mounted on said one of said parts and is swingable therewith and has a recess extending along a surface thereof facing said other part, and
   wherein said second, pressurizable packing member is mounted on said other part and is formed with an elongated projection shaped and dimensioned to mesh with said recess when pressurized.

* * * * *